US009681330B2

(12) United States Patent
An et al.

(10) Patent No.: US 9,681,330 B2
(45) Date of Patent: Jun. 13, 2017

(54) APPARATUS AND METHOD FOR COLLECTING RADIO FREQUENCY FEATURE OF WIRELESS DEVICE IN WIRELESS COMMUNICATION APPARATUS

(71) Applicant: Electronics and Telecommunications Research Institute, Daejeon (KR)

(72) Inventors: Gae-Il An, Daejeon (KR); Hyeok-Chan Kwon, Daejeon (KR); Sok-Joon Lee, Deajeon (KR); Jong-Sik Moon, Daejeon (KR); Do-Young Chung, Daejeon (KR); Sin-Hyo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 14/587,179

(22) Filed: Dec. 31, 2014

(65) Prior Publication Data
US 2015/0288653 A1 Oct. 8, 2015

(30) Foreign Application Priority Data

Apr. 3, 2014 (KR) ........................ 10-2014-0039788

(51) Int. Cl.
*H04W 28/02* (2009.01)
*H04L 29/06* (2006.01)
(Continued)

(52) U.S. Cl.
CPC ........... *H04W 28/0236* (2013.01); *H04L 1/00* (2013.01); *H04L 63/00* (2013.01); *H04W 48/16* (2013.01); *H04L 61/6022* (2013.01)

(58) Field of Classification Search
CPC . H04L 63/1466; H04L 63/0823; H04L 63/10; H04L 2463/101; H04L 63/087
(Continued)

(56) References Cited

U.S. PATENT DOCUMENTS 7,650,148 B2   1/2010  Kim et al.
8,018,883 B2 *  9/2011  Bowser ............... H04L 63/1441
                                                        370/310.1
(Continued)

FOREIGN PATENT DOCUMENTS

KR   10-2010-0073125    7/2010

*Primary Examiner* — Charles C Jiang
*Assistant Examiner* — Will Lin
(74) *Attorney, Agent, or Firm* — Staas & Halsey LLP

(57) ABSTRACT

An apparatus and method for collecting the radio frequency (RF) feature of a wireless device in a wireless communication apparatus are disclosed herein. The RF feature extraction unit adds a tag having a unique value to a received radio signal, and extracts RF feature information from the radio signal. The MAC information extraction unit extracts the source MAC address and tag information of a MAC protocol frame from the received radio signal, and then removes the added tag. The tag comparison unit selects an source MAC address and RF feature information, when the tags have the same value, from the RF feature information and tag information from the RF feature extraction unit and the source MAC address and tag information from the MAC information extraction unit. The RF feature storage unit stores the selected source MAC address and RF feature information.

8 Claims, 3 Drawing Sheets

(51) Int. Cl.
*H04W 48/16* (2009.01)
*H04L 1/00* (2006.01)
*G06K 7/08* (2006.01)
*H04L 29/12* (2006.01)

(58) Field of Classification Search
USPC .......................................................... 726/4, 5
See application file for complete search history.

(56) References Cited

U.S. PATENT DOCUMENTS

| | | | |
|---|---|---|---|
| 8,069,483 B1 | 11/2011 | Matlock | |
| 9,420,469 B2* | 8/2016 | Kwon | H04W 12/08 |
| 2005/0284939 A1* | 12/2005 | Bright | G06K 17/00 |
| | | | 235/451 |
| 2006/0114863 A1* | 6/2006 | Sanzgiri | H04L 63/1466 |
| | | | 370/338 |
| 2007/0025265 A1* | 2/2007 | Porras | G06K 7/0008 |
| | | | 370/252 |
| 2008/0244707 A1* | 10/2008 | Bowser | H04L 63/1441 |
| | | | 726/4 |
| 2009/0016529 A1 | 1/2009 | Gopinath et al. | |
| 2010/0162392 A1 | 6/2010 | Jeong et al. | |
| 2011/0141934 A1* | 6/2011 | Aoki | H04B 17/23 |
| | | | 370/252 |
| 2011/0234385 A1* | 9/2011 | Tarrant | A63F 13/06 |
| | | | 340/10.42 |
| 2011/0299632 A1* | 12/2011 | Mirzaei | H04B 1/006 |
| | | | 375/340 |

* cited by examiner

APPARATUS AND METHOD FOR COLLECTING RADIO FREQUENCY FEATURE OF WIRELESS DEVICE IN WIRELESS COMMUNICATION APPARATUS

CROSS-REFERENCE TO RELATED APPLICATION

This application claims the benefit of Korean Patent Application No. 10-2014-0039788, filed Apr. 3, 2014, which is hereby incorporated by reference herein in its entirety.

BACKGROUND

1. Technical Field

The present disclosure relates generally to an apparatus and method for collecting the radio frequency (RF) feature of a wireless device in a wireless communication apparatus and, more particularly, to an apparatus and method for collecting information about the RF feature of a wireless device that can send and receive radio waves over a wireless local area network (WLAN).

2. Description of the Related Art

A WLAN is a network that wirelessly offers data communication between computers using radio waves without requiring a physical communication line. Recently, thanks to the rapid development of wireless communication technology, such as 802.11n and 802.11ac, and an explosive increase in wireless devices (e.g., mobile devices) using a WLAN, the importance of a WLAN has further increased.

However, security vulnerability inherent in a WLAN has become an obstacle to the active use of a WLAN. One representative security problem in a current WLAN environment is an ID weakness problem. A wireless device refers to a communication device, such as a smart phone or an access point (AP), on a WLAN.

In general, a medium access control (MAC) address, that is, an ID of a network second layer, is chiefly used as an ID that is used to identify a wireless device on a WLAN. An MAC address is frequently used as a certification and authentication mechanism on the 802.11 wireless network because it can globally identify a network device. However, there is a need for a method that is capable of detecting and defending a MAC address spoofing attack because such a MAC address may be easily manipulated by an attacker.

One current best method for detecting a MAC address spoofing attack is a method of identifying a wireless device using an RF feature. In the method of identifying a wireless device based on an RF feature, a wireless device is uniquely identified based on RF information, such as a modulation error and a signal transmission transient shape, which is generated due to a minute difference between hardware elements in each wireless device. The modulation error is information that is generated when a wireless device that sends data modulates a digital signal into an analog signal. Information for measuring a modulation error includes EVM, a frame frequency error, an I/Q origin offset, and a sync correlation. The signal transmission transient shape refers to information about signal transition between a point of time at which a packet starts to be transmitted and a point of time at which a signal corresponding to the packet is actually transmitted. Accordingly, in order to identify a wireless device, the MAC address and RF feature information of the wireless device need to be collected.

FIG. 1 is a block diagram illustrating the configuration of a typical wireless communication apparatus.

The typical wireless communication apparatus of FIG. 1 includes an RF processing unit 1 configured to process a wireless analog signal to be transmitted or having been received, an analog-to-digital/digital-to-analog (AD/DA) processing unit 2 configured to convert a digital signal to be transmitted into an analog signal through the RF processing unit 1 and to convert an analog signal have been received into a digital signal through the RF processing unit 1, a baseband processing unit 3 configured to perform a channel coding and modulation function on data to be transmitted through the RF processing unit 1 and perform a demodulation and error correction function on data having been received through the RF processing unit 1, and a MAC processing unit 4 configured to perform a data link processing function according to a MAC protocol.

A WLAN card that is used in a wireless AP and a wireless terminal corresponds to a wireless communication apparatus. A process in which a wireless device sends data is described below. First, the MAC processing unit 4 generates a MAC frame in which the MAC addresses of a source and a destination have been set. The baseband processing unit 3 modulates the digital MAC frame according to a channel characteristic. The AD/DA conversion unit 2 converts the digital signal into an analog signal. The RF processing unit 1 processes the generated analog signal, and sends the processed signal to the outside.

A process in which a wireless device receives data is opposite to the process of sending data. First, the RF processing unit 1 processes a received analog signal. The AD/DA conversion unit 2 converts the analog signal into a digital signal, and transfers the digital signal to the baseband processing unit 3. The baseband processing unit 3 performs a demodulation and error correction function on the digital signal. Finally, the MAC processing unit 4 processes link layer data by decoding a MAC frame.

As described above, conventionally, information about the RF feature of a wireless device is collected using a wireless measuring instrument because a wireless communication apparatus does not offer a direct function of collecting the MAC address of the wireless device and corresponding RF feature information.

The conventional method using a wireless measuring instrument may be problematic in that a wireless device identification speed is low because the RF feature of a wireless device is not collected in real time.

Accordingly, there is a need for a method and apparatus that are capable of collecting the MAC address and RF feature information of a wireless device in real time in a wireless communication apparatus. The collected RF feature information may be information of high quality at a level at which the wireless device can be accurately identified based on the information.

As an example of related art, U.S. Pat. No. 8,018,883 entitled "Wireless Transmitter Identity Validation in a Wireless Network" discloses technology in which when a radio signal is received, the RF feature of the received radio signal is determined, a network identifier (i.e., MAC address) is determined by decoding the received radio signal, the behavior feature of the received radio signal is determined, and whether the network identifier of the received radio signal has been forged is determined using the network identifier, RF feature and behavioral feature of the received radio signal.

SUMMARY

At least one embodiment of the present disclosure is directed to the provision of an apparatus and method that are capable of collecting the source MAC address and high-quality RF feature information of received wireless data in real time in a typical wireless communication apparatus so that a wireless device can be accurately identified.

In accordance with an aspect of the present disclosure, there is provided an apparatus for collecting the radio frequency (RF) feature of a wireless device in a wireless communication apparatus, the apparatus including an RF feature extraction unit configured to add a tag having a unique value to a received radio signal and extract RF feature information from the radio signal; a media access control (MAC) information extraction unit configured to extract the source MAC address and tag information of a MAC protocol frame from the received radio signal and then remove the added tag; a tag comparison unit configured to select an source MAC address and RF feature information, when the tags have the same value, from the RF feature information and tag information from the RF feature extraction unit and the source MAC address and tag information from the MAC information extraction unit; and an RF feature storage unit configured to store the selected source MAC address and RF feature information.

The apparatus may further include a defective RF information filtering unit configured to filter out information of poor quality from the RF feature information, selected by the tag comparison unit, based on the quality of the received radio signal. In this case, the RF feature storage unit may store a source MAC address and RF feature information that have passed through the defective RF information filtering unit.

The defective RF information filtering unit may exclude the extracted RF feature information from the received radio signal if the strength and signal to noise ratio values of the received radio signal are outside of an allowable range.

The RF feature information may include modulation error information and signal transition information.

The modulation error information may include one or more of EVM, a frame frequency error, an UQ origin offset, and a sync correlation.

The signal transition information may be indicative of signal transition between a point of time at which a packet starts to be transmitted and a point of time at which a signal corresponding to the packet is actually transmitted.

In accordance with an aspect of the present disclosure, there is provided a method of collecting an RF feature of a wireless device in a wireless communication apparatus, the method including adding, by an RF feature extraction unit, a tag having a unique value to a received radio signal, and extracting RF feature information from the radio signal; extracting, by a MAC information extraction unit, a source MAC address and tag information of a MAC protocol frame from the received radio signal, and then removing the added tag; selecting, by a tag comparison unit, a source MAC address and RF feature information, when the tags have an identical value, from the RF feature information and tag information, extracted in adding the tag and extracting the RF feature information, and the source MAC address and tag information, extracted in extracting the source MAC address and tag information and removing the added tag; and storing, by the tag comparison unit, the selected source MAC address and RF feature information in a storage unit.

The method may further include filtering out, by a defective RF information filtering unit, information of poor quality from the RF feature information, selected in the selection of the source MAC address and RF feature information, based on the quality of the received radio signal. In this case, storing the selected source MAC address and RF feature information may include storing a source MAC address and RF feature information that have passed through the filtering out of the information of poor quality.

BRIEF DESCRIPTION OF THE DRAWINGS

The above and other objects, feature and advantages of the present disclosure will be more clearly understood from the following detailed description taken in conjunction with the accompanying drawings, in which.

DETAILED DESCRIPTION

Figure 1:
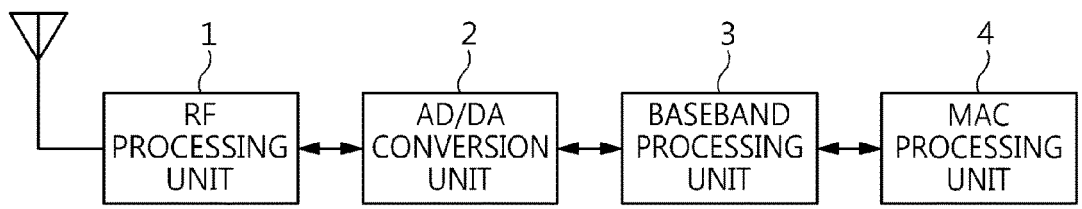
FIG. 1 is a block diagram illustrating the configuration of a typical wireless communication apparatus.

The present disclosure may be modified in various ways and may include various embodiments. Specific embodiments will be illustrated in the drawings and described in detail.

It is however to be understood that the present disclosure is not intended to be limited to the specific embodiments but the specific embodiments include all modifications, equivalents, and substitutions that fall within the spirit and technical scope of the present disclosure.

The terms used herein are used merely to describe specific embodiments, but are not intended to limit the present invention. The singular expressions used herein include plural expressions unless explicitly stated otherwise in the context thereof. It should be appreciated that in this application, the use of the terms "include(s)," "comprise(s)", "including" and "comprising" is intended to denote the presence of the characteristics, numbers, steps, operations, elements, or components described herein, or combinations thereof, but is not intended to exclude the probability of presence or addition of one or more other characteristics, numbers, steps, operations, elements, components, or combinations thereof.

Unless defined otherwise, all the terms used herein have the same meanings as typically understood by those having ordinary skill in the art. The terms, such as ones defined in common dictionaries, should be interpreted to have the same meanings as terms in the context of pertinent technology, and should not be interpreted to have ideal or excessively formal meanings unless clearly defined in the specification.

Exemplary embodiments of the present disclosure will be described in detail below with reference to the accompanying drawings. In the following description of the present disclosure, in order to help a general understanding of the present disclosure, the same reference numerals will be used to denote the same elements throughout the drawings, and redundant descriptions of the same elements will be omitted.

The greatest problem with the collection of RF feature information is to determine the source of a radio signal from which the RF feature has been extracted. The RF feature information does not include an identifier for identifying the information because it is extracted while an analog signal corresponding to a physical layer is being processed. An MAC address that may be used as an identifier of a wireless system may be known only after a MAC frame decoding process, executed after a received radio signal has been processed in the physical layer, has been terminated. In at least an embodiment of the present disclosure, a tag is used to determine the identifier (i.e., MAC address) of extracted RF feature information.

Figure 2:
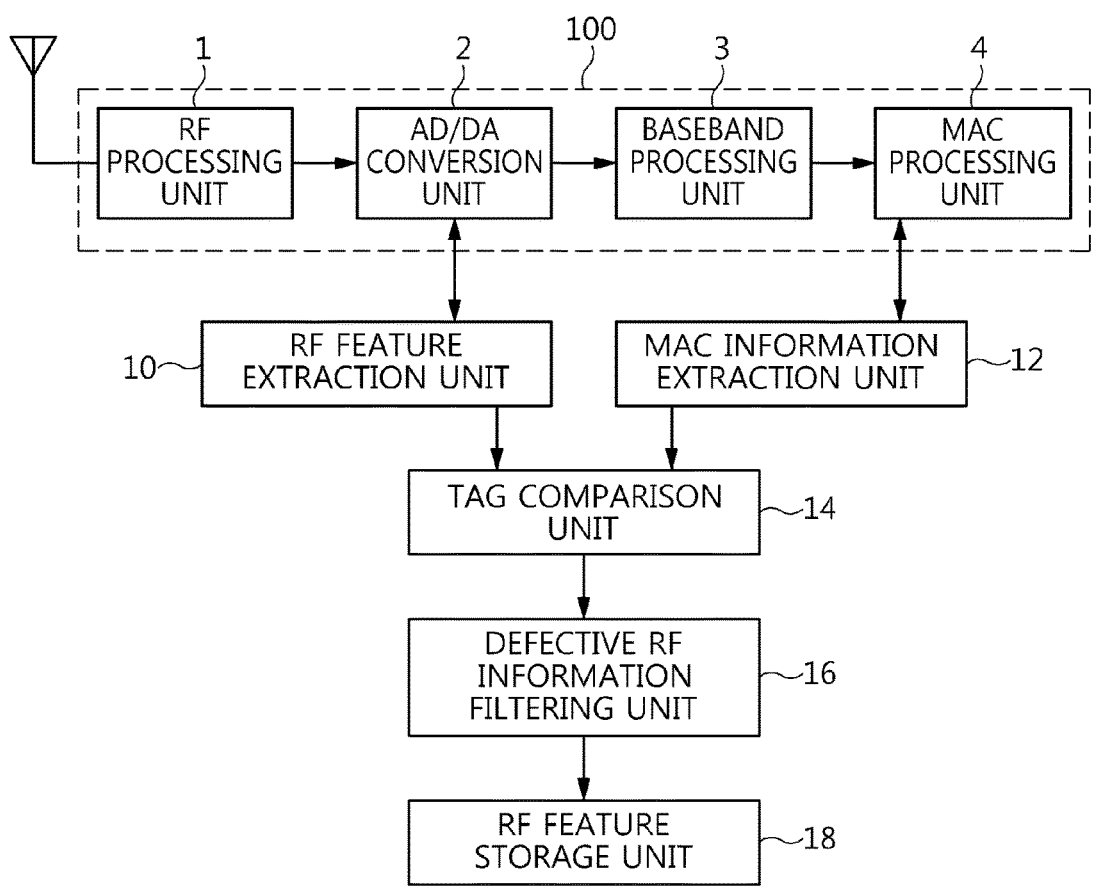
FIG. 2 is a block diagram illustrating the configuration of an apparatus for collecting the RF feature of a wireless device in a wireless communication apparatus in accordance with an embodiment of the present disclosure.

FIG. 2 is a block diagram illustrating the configuration of an apparatus for collecting the RF feature of a wireless device in a wireless communication apparatus in accordance with an embodiment of the present disclosure.

Referring to FIG. 2, the wireless communication apparatus 100 includes an RF processing unit 1, an analog-to-digital/digital-to-analog (AD/DA) conversion unit 2, a baseband processing unit 3, and a MAC processing unit 4. In this case, the wireless communication apparatus 100 is the same as the wireless communication apparatus described with reference to FIG. 1, and thus a further description thereof is omitted. In FIG. 2, the wireless communication apparatus 100 has been illustrated as being capable of functioning only to receive radio signals and process received signals.

The apparatus for collecting the RF feature of a wireless device in accordance with an embodiment of the present disclosure includes an RF feature extraction unit 10, a MAC information extraction unit 12, a tag comparison unit 14, a defective RF information filtering unit 16, and an RF feature storage unit 18.

The RF feature extraction unit 10 adds information about a tag having a unique value to a radio signal received by the wireless communication apparatus 100, and extracts information about the RF feature of the radio signal. In other words, when the wireless communication apparatus 100 receives a radio signal (i.e., an analog signal), the AD/DA conversion unit 2 of the wireless communication apparatus 100 converts the received analog radio signal into a digital signal. In this case, modulation error information, such as EVM, a frame frequency error, an I/Q origin offset and/or a sync correlation, and signal transition information are generated. The RF feature extraction unit 10 extracts the modulation error information and the signal transition information as RF feature information. Furthermore, the RF processing unit 1 generates a tag having a unique value so that the received radio signal may be identified, and adds the tag to the radio signal.

The MAC information extraction unit 12 extracts the source MAC address and tag information of a MAC protocol frame from the radio signal received by the wireless communication apparatus 100, and removes the tag added to the radio signal by the RF feature extraction unit 10. In other words, when the wireless communication apparatus 100 receives the radio signal, the MAC processing unit 4 decodes the MAC protocol frame via the RF processing unit 1, the AD/DA conversion unit 2, and the baseband processing unit 3. Although the MAC processing unit 4 may extract the MAC address of the MAC protocol frame corresponding to the received radio signal, a problem arises in that an error occurs due to the tag added to the radio signal by the RF feature extraction unit 10 when the MAC processing unit 4 decodes the MAC protocol frame. Accordingly, in order to avoid the problem, the MAC information extraction unit 12 extracts the source MAC address of the MAC protocol frame from the received radio signal, and then removes the tag added to the radio signal by the RF feature extraction unit 10.

The tag comparison unit 14 selects a source MAC address and RF feature information, when tags have the same value, from the RF feature information and the tag information from the RF feature extraction unit 10 and the source MAC address and the tag information from the MAC information extraction unit 12.

The defective RF information filtering unit 16 filters out (or removes) information of poor quality from the RF feature information from the tag comparison unit 14 based on the quality of the received radio signal.

The extraction of RF feature information of high quality from a received radio signal is a prerequisite for the accurate identification of a wireless device. Currently, the strength of a received radio signal is represented by received signal strength indication (RSSI). RSSI is a numerical value measured in dB. In general, RSSI has a value ranging from 0 dB to −120 dB. When a measured value is closer to 0, it means that the strength of a received signal is stronger. It is known that the value of RSSI for normal wireless communication between two wireless systems over a data network is −80 dB or more.

A received radio signal includes noise as well as a signal of a counterpart system. Noise refers to a signal other than Wi-Fi traffic, such as microwaves and a radio call. Noise is also a value measured in decibels (dB), and has a value ranging from 0 dB to −120 dB. When a measured value is closer to −120, it means that signal interference is further reduced. Signal-to-noise ratio (SNR) is used to represent the ratio of signal strength to noise. The SNR is indicative of the relative magnitude of signal power by means of the strength of signal power to noise power. In general, it is known that a signal has good quality when the SNR is 20 or more.

Accordingly, in order to extract RF feature information of high quality, if the measured value of the strength (i.e., RSSI value) of the received radio signal and the SNR (i.e., SNR) value of the received radio signal are outside of an allowable range, the defective RF information filtering unit 16 determines that the received radio signal has poor quality. Furthermore, the defective RF information filtering unit 16 excludes (or removes) RF feature information from a radio signal having poor quality.

The RF feature storage unit 18 stores the source MAC address and RF feature information (i.e., RF feature information of high quality) of a radio signal determined to have good quality through the defective RF information filtering unit 16.

Although the defective RF information filtering unit 16 has been illustrated as being included in the apparatus of FIG. 2, the defective RF information filtering unit 16 may not be include if required. That is, if the defective RF information filtering unit 16 is omitted, the source MAC address and RF feature information selected by the tag comparison unit 14 may be stored in the RF feature storage unit 18. In order to collect RF information of better quality, however, the defective RF information filtering unit 16 may be preferably included in the apparatus of FIG. 2.

Figure 3:
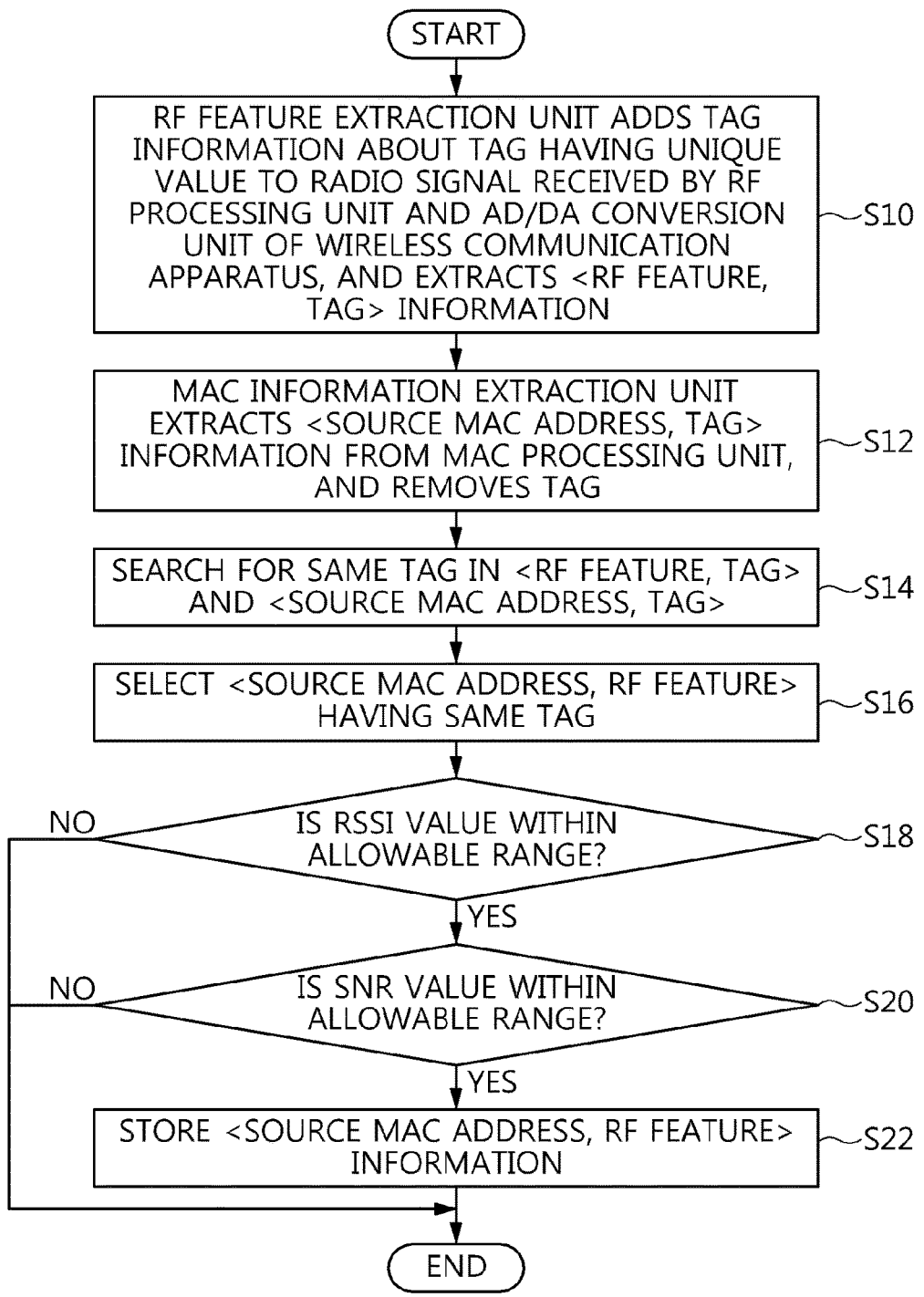
FIG. 3 is a flowchart illustrating a method of collecting the RF feature of a wireless device in accordance with an embodiment of the present disclosure.

FIG. 3 is a flowchart illustrating a method of collecting the RF feature of a wireless device in accordance with an embodiment of the present disclosure. Referring to FIG. 3, the method of collecting the RF feature of a wireless device in accordance with the present embodiment includes adding a tag having a unique value to a received radio signal and extracting RF feature information from the received radio signal, extracting the source MAC address and tag information of a received MAC protocol frame and removing the tag, searching for the same tag in the extracted RF feature information and tag information and the extracted source MAC address and tag information, selecting a source MAC address and RF feature information from information having the same tag, excluding the extracted RF feature information from a corresponding radio signal if an RSSI value and an SNR value are not present in an allowable range, and storing the source MAC address and the RF feature information.

The method of collecting the RF feature of a wireless device in accordance with the present embodiment is performed as follows.

First, the RF feature extraction unit 10 adds information about a tag having a unique value to a radio signal received by the RF processing unit 1 and AD/DA conversion unit 2 of the wireless communication apparatus 100 and then extracts RF feature information at step S10. In this case, the RF feature information refers to modulation error information, such as EVM, a frame frequency error, an I/Q origin offset and/or a sync correlation, and information about signal transition between a point of time at which a packet starts to be transmitted and a point of time at which a signal corresponding to the packet is actually transmitted.

The received radio signal is finally transferred to the MAC processing unit 4 in a frame form through the RF processing unit 1, the AD/DA conversion unit 2, and the baseband processing unit 3. The MAC information extraction unit 12 extracts the source MAC address and tag information of the frame received from the MAC processing unit 4 and removes the tag information added to the received frame at step S12.

Thereafter, in order to determine a wireless system to which the extracted RF feature information is related, the tag comparison unit 14 searches for the same tag in the RF feature information and tag information from the RF feature extraction unit 10 and the source MAC address and tag information from the MAC information extraction unit 12 at step S14.

Furthermore, the tag comparison unit 14 selects a source MAC address and RF feature information when the tags have the same value at step S16.

The extracted RF feature information may have low quality due to the low strength of a corresponding signal or a signal interference phenomenon attributable to noise.

Accordingly, if the RSSI value and SNR value of the radio signal of the extracted RF feature information are outside of an allowable range, the defective RF information filtering unit 16 excludes (or removes) corresponding RF feature information at steps S18 and S20. In this case, the allowable range may be set by an administrator in advance.

The RF feature information and source MAC address of a radio signal determined to have good quality by the defective RF information filtering unit 16 are stored in the RF feature storage unit 18 at step S22.

As described above, in accordance with at least one embodiment of the present disclosure, optimum information required to accurately identify a wireless device can be effectively provided because the source MAC address and high-quality RF feature information of a received radio signal can be collected in real time in a wireless communication apparatus.

The exemplary embodiments have been disclosed in the drawings and specification. Specific terms have been used herein, but the terms are used merely to describe the present disclosure, but are not used to limit the meaning of the terms or the scope of the present disclosure set forth in the claims. Accordingly, those skilled in the art will appreciate that various modifications and other equivalent embodiments are possible from the present disclosure. Accordingly, the true scope and technical spirit of the present disclosure should be determined by the following claims.

What is claimed is:

1. An apparatus for collecting a radio frequency (RF) feature of a wireless device in a wireless communication apparatus, the apparatus comprising:
   one or more processor configured to implement:
   an RF feature extraction unit configured to add information of a tag having a value to a radio signal and extract RF feature information from the radio signal, the RF feature information being extractable from the radio signal as the radio signal is being received;
   a media access control (MAC) information extraction unit configured to extract a source MAC address and the information of the tag of a MAC protocol frame from the radio signal having the information of the tag added, and remove the information of the tag added;
   a tag comparison unit configured to select the source MAC address and the RF feature information as identifiers of the wireless device provided a comparison of the extracted RF feature information and the information of the tag from the RF feature extraction unit and the extracted source MAC address and the information of the tag from the MAC information extraction unit results in the information of the tag from the RF feature extraction unit and the information of the tag from the MAC information extraction unit have an identical value, the information of the tag being useable to determine the source MAC address of the RF feature information corresponding to the received radio signal;
   a defective RF information filtering unit configured to filter out information of poor quality from the RF feature information, selected by the tag comparison unit, based on quality of the received radio signal; and
   an RF feature storage configured to store the selected source MAC address and the RF feature information in association with the wireless device,
   wherein the RF feature storage stores the source MAC address and the RF feature information that have passed through the defective RF information filtering unit,
   wherein the defective RF information filtering unit excludes the extracted RF feature information from the received radio signal when strength and signal to noise ratio values of the received radio signal are outside of an allowable range.

2. The apparatus of claim 1, wherein the RF feature information comprises modulation error information and signal transition information.

3. The apparatus of claim 2, wherein the modulation error information comprises one or more of Error Vector Magnitude (EVM), a frame frequency error, an I/Q origin offset, and a sync correlation.

4. The apparatus of claim 2, wherein the signal transition information is indicative of signal transition between a point of time at which a packet starts to be transmitted and a point of time at which a signal corresponding to the packet is actually transmitted.

5. A method of collecting an RF feature of a wireless device in a wireless communication apparatus, the method comprising:
   adding, by an RF feature extraction unit, information of a tag having a value to a radio signal, and extracting RF feature information from the radio signal, the RF feature information being extractable from the radio signal as the radio signal is being received;
   extracting, by a MAC information extraction unit, a source MAC address and the information of the tag of a MAC protocol frame from the radio signal having the information of the tag added, and removing the information of the tag added;

selecting, by a tag comparison unit, the source MAC address and the RF feature information as identifiers of the wireless device provided a comparison of the extracted RF feature information and the extracted information of the tag of the RF feature extraction unit and the source MAC address and the information of the tag of the MAC information extraction unit results in the information of the tag from the RF feature extraction unit and the information of the tag from the MAC information extraction unit have an identical value, the information of the tag being useable to determine the source MAC address of the RF feature information corresponding to the received radio signal;

filtering out, by a defective RF information filtering unit, information of poor quality from the RF feature information, selected in the selection of the source MAC address and the RF feature information, based on quality of the received radio signal; and storing, by the tag comparison unit, the selected source MAC address and the RF feature information in a storage unit in association with the wireless device, wherein the storing of the selected source MAC address and the RF feature information comprises storing the source MAC address and the RF feature information that have passed through the filtering out of the information of poor quality, wherein filtering the information of poor quality comprises excluding the extracted RF feature information from the received radio signal when strength and signal to noise ratio values of the received radio signal are outside of an allowable range.

6. The method of claim 5, wherein the RF feature information comprises modulation error information and signal transition information.

7. The method of claim 6, wherein the modulation error information comprises one or more of Error Vector Magnitude (EVM), a frame frequency error, an I/Q origin offset, and a sync correlation.

8. The method of claim 6, wherein the signal transition information is indicative of a signal transition between a point of time at which a packet starts to be transmitted and a point of time at which a signal corresponding to the packet is actually transmitted.

\* \* \* \* \*